United States Patent [19]

DalMonte

[11] 3,713,106

[45] Jan. 23, 1973

[54] SWITCHING SYSTEM FOR INTERCONNECTED PCM LINES

[75] Inventor: Giorgio Dal Monte, Milan, Italy

[73] Assignee: Societa Italiana Telecomunicazioni Siemens S.p.A., Milan, Italy

[22] Filed: Feb. 10, 1971

[21] Appl. No.: 114,328

[30] Foreign Application Priority Data

Feb. 10, 1970 Italy ............................20398 A/70

[52] U.S. Cl. ..........................340/172.5, 179/15 BV

[51] Int. Cl. ..............................................H04j 3/00

[58] Field of Search...340/172.5; 179/15 AQ, 15 BA, 179/15 BV, 11

[56] References Cited

UNITED STATES PATENTS

| | | | |
|---|---|---|---|
| 3,516,074 | 6/1970 | Enomoto | 340/172.5 |
| 3,331,060 | 7/1967 | Willis | 340/172.5 |
| 3,466,397 | 9/1969 | Benowitz | 179/15 BA |
| 3,573,752 | 4/1971 | Lyghounis | 340/172.5 |
| 3,601,545 | 8/1971 | Saburi | 179/15 BA |

*Primary Examiner*—Paul J. Henon
*Assistant Examiner*—Sydney R. Chirlin
*Attorney*—Karl F. Ross

[57] ABSTRACT

For the selective establishment of temporary connections between a number of incoming pulse-code-modulation channels on one or more lines terminating at an exchange and a like number of outgoing channels of this type on one or more lines originating at that exchange, the two sets of channels being sampled in different rhythms, the exchange generates a succession of transfer periods *tx* at a frequency higher than each of the two sampling frequencies. Each sampling period is divided into several time intervals at least one of which has a duration equal to or less than the difference $\Delta t'$ between the sampling period $tp'$ of the incoming channels and the transfer period *tx*. During the latter time interval, occurring, at least once per sampling period $tp'$, the bits inscribed by each incoming channel in either of two alternately receptive registers (A, B) of a first memory stage $M_I$ are transferred to a respective register of an intermediate memory stage ($M_{II}$ or $M_{III}$) having one register for each incoming channel. From there, possibly after transmission to another intermediate memory stage ($M_{III}$) with the same number of registers during the remaining part of a transfer period, the bits are read out to either of two alternately receptive registers (C, D) of a final memory stage ($M_{IV}$) during another time interval whose duration is equal to or less than the difference $\Delta t''$ between the sampling period $tp''$ of the outgoing channels and the transfer period *tx*. The two registers (C, D) of the final memory stage are alternately discharged in the rhythm of the outgoing channels for delivering their contents to the latter channels in a sequence determined by a pattern of temporary connections established between two of the memory stages under the control of an associated programmer.

9 Claims, 21 Drawing Figures

SWITCHING SYSTEM FOR INTERCONNECTED PCM LINES

My present invention relates to a communication system of the pulse-code-modulation type with an intermediate switching station or exchange inserted between one or more incoming lines and one or more outgoing lines for temporarily connecting the several incoming PCM channels to respective outgoing PCM channels under the control of a programmer.

The term "channel", as herein used, denotes a succession of periodically recurrent time slots interleaved with similar time slots of other channels in a predetermined rhythm, each time slot carrying a digital code combination in the form of a number of bits representing, for example, the instantaneous amplitude of a voice signal to be transmitted over the respective channel. In a typical system of this type, used for the transmission of data or sound, a frame (i.e., a cycle of recurrence) consists of 32 time slots each containing eight bits for a total of 256 bits per frame, the frames following one another at a repetition rate or cadence of 8,000 cps corresponding to 2.048 Mbit per second.

Since the sampling frequency (i.e., the cadence of the time slots) is determined by a timer at the input end of each line, exact synchronism between the occurrence of these time slots in the outputs of lines of different origin terminating at a common exchange is virtually impossible to achieve. With the channels from several incoming lines designed to be selectively redistributed over several outgoing lines, the outgoing sampling frequency generally will not match the incoming one. Normally, therefore, the sampling frequency of the incoming channels will differ from that of the outgoing channels to which they are to be connected. Even if incoming and outgoing lines are driven at the same sampling frequency with the aid of a synchronizing circuit, unavoidable drifts due, for example, to temperature variations may cause relative phase shifts between the incoming and outgoing frames which may lead to loss or distortion of information on one or more channels.

The general object of my present invention, therefore, is to provide means at such an exchange for improving the transfer of messages between groups of incoming and outgoing channels regardless of relative phase shifts or differences in sampling frequency.

A more specific object is to provide reliable circuitry for preserving, in transmission, the maximum amount of information that can be transferred from one PCM channel to another.

In accordance with the present invention, I provide a multistage memory whose first and final stages each include one or more registers for receiving successive code combinations from respective incoming channels and for delivering these code combinations to respective outgoing channels in a sequence selected by the associated programmer; between these two memory stages I provide one or more intermediate stages each with $n$ registers corresponding to the number of both incoming and outgoing channels, these registers serving for the concurrent storage of respective code combinations from all the incoming channels preparatorily to retransmission over the selected outgoing channels. In the specific system referred to above, and with only one incoming and one outgoing line, $n$ would equal 30 since one channel (e.g., the 16th) is normally utilized to convey switching information to the programmer of the exchange, or to some other station therebeyond, whereas a further channel (the 32nd) is used for the transmission of synchronizing signals. The incoming code combinations are successively inscribed, in the rhythm of their own sampling frequency, in the first memory stage which advantageously comprises a pair of registers alternately conditionable for reception by a timer responsive to that sampling frequency. This first memory stage is read out into the registers of the next stage, under the control of a transfer circuit, at a frequency higher than both the incoming and the outgoing sampling frequency, this higher frequency also determining the rate at which the stored code combinations are transmitted to the final memory stage for delivery to the outgoing channels. This latter stage, advantageously, also comprises a pair of registers that are alternatively readable under the control of another timer in the rhythm of the outgoing sampling frequency; it is to be understood that in a specific case, in which the two sampling frequencies are equal, the two timers could be respective outputs of a single pulse generator.

The reading of the code combinations stored in the first memory stage, carried out at a rate faster than the recurrence rate of the time slot of any incoming channel, does not involve any loss of information originally conveyed. If the outgoing sampling frequency is lower than the incoming one, some codes will be unavoidably missed in the transfer; this loss, however, is no greater than would occur with perfect phase-shift compensation upon direct transmission from a higher-frequency to a lower-frequency line. If, on the other hand, the outgoing sampling frequency exceeds the incoming one, no information is lost even though an occasional incoming code combination will have to be repetitively read out into an outgoing channel. The registers of the intermediate memory stage should be nondestructibly readable, i.e., their contents should remain unchanged even after readout until modified by the inscription of a new code combination, in order to prevent the transfer of a blank code in such a case.

The intermediate-stage registers may be divided into two cascaded sets of $n$ registers each, these two sets being connected by signal paths switchable under the control of the programmer; if only one intermediate memory stage is provided, the switching will take place between this stage and either the input or the output stage.

In view of the relatively high transfer frequency, the transmission of code combinations from the input stage to the intermediate-stage registers and from the latter to the output stage must be performed during brief intervals which, as will become apparent hereinafter, should be equal to or less than the difference between the length of the respective (incoming or outgoing) time slots and the duration of a transfer period. Thus, such a transfer period may be divided into at least two intervals at least one of which satisfies the condition just stated, i.e., has a duration not exceeding the aforementioned difference, this interval occurring at least once per incoming or outgoing time slot and being therefore utilizable for the transfer into and out of the intermediate memory stage or stages. In the presence of two cascaded intermediate stages, the transmission from the first to the second set of registers may take place during the other, advantageously longer, interval of a transfer period; with only a single set of intermediate-stage registers, the transfer period may include two or more preferably identical subdivisions or phases to be used partly for the inscription and partly for the readout.

If the groups of incoming and outgoing channels are each divided into $k$ subgroups of $n$ channels each, up to $k$ intermediate-stage registers (out of a total of $kn$ such registers) loaded during one phase may be successively read during other phases of a single transfer period having at least $k+1$ phases. Conversely, the intermediate-stage registers may be successively loaded during up to $k$ phases in a common transfer period and may be read during a further phase.

The above and other features of my invention will be described in detail hereinafter with reference to the accompanying drawing in which.

Figure 1:
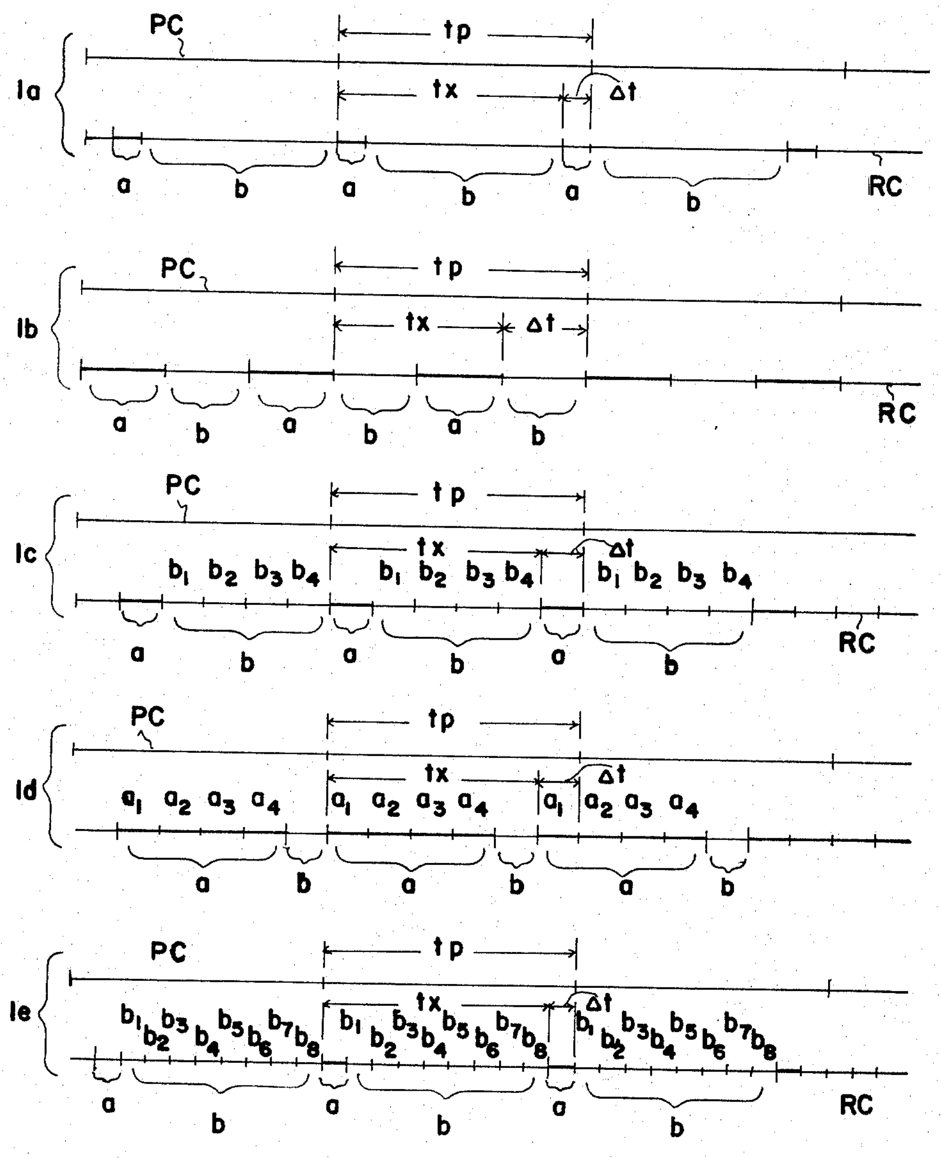
FIG. 1 is a set of time diagrams illustrating the relationship between sampling and transfer periods in a system according to the invention.

In each of the five graphs 1*a* – 1*e* of FIG. 1 I have indicated on an upper line PC part of a frame of an incoming or outgoing PCM line, divided into time slots $tp$, and on a lower line RC the rhythm of a clock circuit with an operating period $tx$ shorter than sampling period $tp$ and divided into two subperiods $a$, $b$. In graph 1*a*, subperiod $a$ is substantially shorter than subperiod $b$ and equals the difference $\Delta t$ between periods $tp$ and $tx$. In graph 1*b* the same relationship exists between $\Delta t$ and $a$, the latter being equal to subperiod $b$ so that $tp = 1.5\ tx$, i.e., the transfer frequency is 5 percent higher than the sampling frequency. In graph 1*c* there is again equality between $a$ and $\Delta t$ yet subperiod $b$ has been subdivided into four intervals or phases $b_1 - b_4$ each equal to subperiod $a$; in this specific case, therefore, $a = \Delta t = tp/5$, with the transfer frequency exceeding the sampling frequency by 20 percent. Graph 1*d* represents the reversal of graph 1*c*, with the first part $a$ of each transfer period $tx$ extending over four-fifths of that period while being subdivided into four phases $a_1 - a_4$ each equal to the subperiod $b = \Delta t$. In graph 1*e*, finally, the relationship is similar to that of graph 1*c* except that subperiod $b$ has been divided into eight phases $b_1 - b_8$ equal to $a = \Delta t$, the transfer frequency $1/tx$ being therefore about 11 percent higher than the sampling frequency $1/tp$. Each of these instances has particular significance for one or more embodiments described in detail hereinafter; it will be noted that in each instance the smallest subdivision of transfer period $tx$ is exactly equal to the time difference $\Delta t$, this being, however, a limiting case inasmuch as such subdivision could also be shorter than $\Delta t$ as will become apparent hereinafter.

Figure 2:
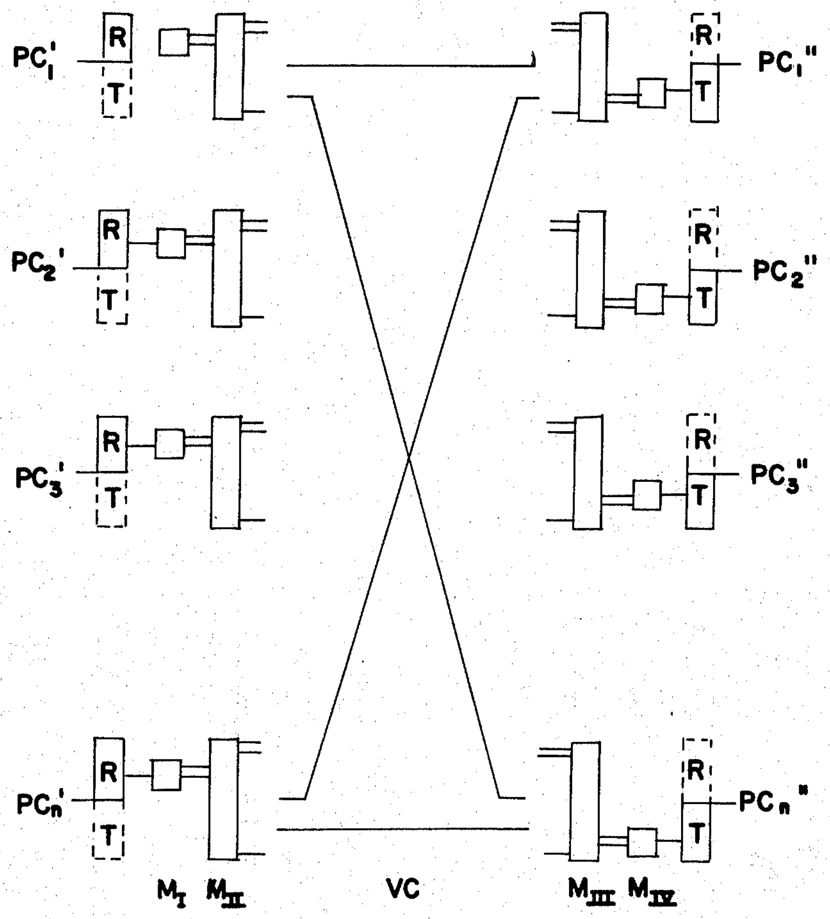
FIG. 2 is a schematic layout of a switching system according to the invention.

FIG. 2 shows the basic layout of a system embodying my invention. A first group of lines $PC_1' - PC_N'$, each carrying a multiplicity of PCM channels, can communicate with a second group of such lines $PC_1'' - PC_N''$ by way of a memory having four stages $M_I$, $M_{II}$, $M_{III}$, $M_{IV}$ and a switching circuit VC interconnecting the stages $M_{II}$ and $M_{III}$. Each line has a receiving termination R and a transmitting termination T; for purposes of the ensuing description, however, lines $PC_1' - PC_N'$ will be assumed to carry only incoming channels while lines $PC_1'' - PC_N''$ carry only outgoing channels, the first group of lines working into the memory stage $M_I$ via their receiving sections R while the second group of lines have their transmitting sections T served by the memory stage $M_{IV}$. The other two sections, shown in dotted lines, operate in an analogous manner for the transmission in the opposite direction and need not be further discussed.

The term "lines", as used herein, includes not only metallic circuits but also radio links.

The first or input stage $M_I$ of the memory includes for each line $PC_1' - PC_N'$ a unit consisting of a pair of shift registers A and B (FIG. 9) working alternately in reception and in transmission, the odd-numbered code combinations being successively inscribed in one register and being read out therefrom during inscription of the even-numbered code combinations in the other register. In an analogous manner, the final or output stage $M_{IV}$ of the memory comprises a plurality of units, one for each line $PC_1'' - PC_N''$, each formed by two alternately receiving and transmitting shift registers C and D (FIG. 10). The two intermediate memory stages $M_{II}$ and $M_{III}$ include as many registers per line as there are channels, these registers being nondestructively readable as defined above. The connector VC, designed to establish temporary signal paths between any incoming channel and any outgoing channel to the extent of their availability, operates under the control of a programmer EC (FIG. 8) and may have various configurations described in greater detail hereinafter with reference to FIGS. 11–17 and 19.

Figure 3:
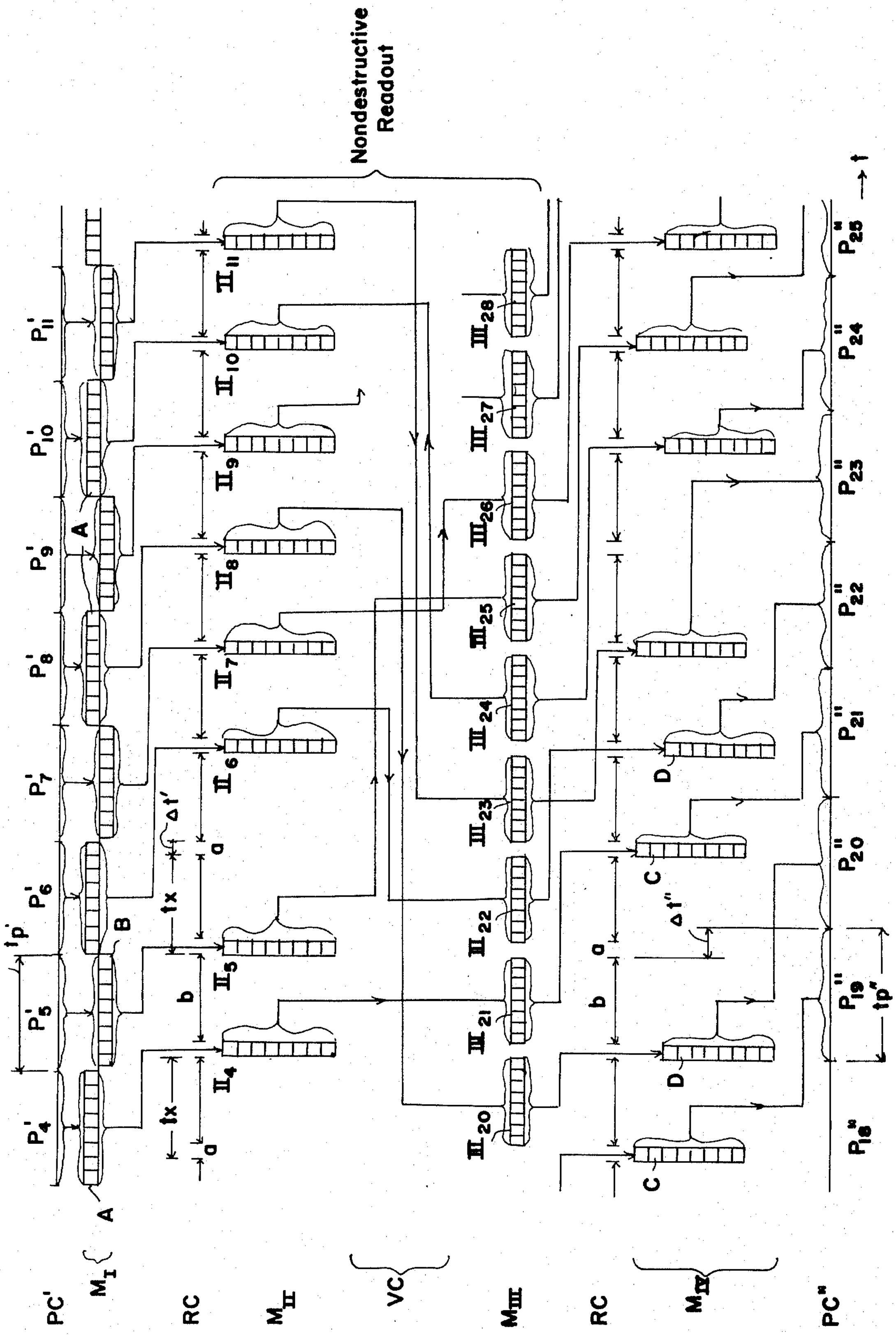
FIG. 3 is a flow chart showing the passage of information through the system of FIG. 2.

FIG. 3 shows the flow of messages from an incoming PCM line PC′ to an outgoing line PC″ by way of the four-stage memory illustrated in FIG. 2. Registers A, B of stage $M_I$ and C, D of stage $M_{IV}$, which physically exist only once in the memory section assigned to the two lines PC′ and PC″, have been reproduced in FIG. 3 in each time position in which they are active, thereby facilitating the graphic representation of the several pathways followed by the transmitted code combinations.

Each of these code combinations consists of eight bits to be stored in as many binary elements of any of these registers. The inscription in shift register A or B, occurring during a sampling period ($P_4' - P_{11}'$) of duration $tp'$, takes place in the rhythm of the arriving bits, i.e., serially. The same is true of the readout of shift registers C or D, occuring in a sampling period ($P_{18}'' - P_{25}''$) of duration $tp''$ which in this instance slightly exceeds the period $tp'$. The transfer within the memory itself may be carried out serially or in parallel; in the present instance the loading of the second stage $M_{II}$ and of the final stage $M_{IV}$ proceeds during a relatively short subperiod $a$ (see graph 1$a$ of FIG. 1) and therefore advantageously is carried out in parallel, whereas the contents of registers $II_4 - II_{11}$ of stage $M_{II}$ may be conveniently read out serially into registers such as $III_{20} - {}_{III28}$ of stage $M_{III}$ inasmuch as a substantially longer subperiod $b$ is available for this transfer. Naturally, the choice of serial or parallel readout depends on such factors as the number of transmission lines that can be accommodated by the exchange and the highest pulse rate of which the system is capable.

As shown in FIG. 3, the transfer period $tx$ of clock circuit RC (reproduced on two lines for easier comparison) is shorter than each of the two sampling periods $tp'$ and $tp''$, the difference $\Delta t' = tp' - tx$ being equal to the transfer intervals $a$ whereas the difference $\Delta t'' = tp'' - tx$ is larger than that interval. Owing to this relationship, the complete interval $a$ occurs at least once during each sampling period or time slot $P_4' - P_{11}'$ and $P_{18}'' - P_{25}''$ so that input registers A and B can discharge during their respective off-periods (even-numbered time slots $P_4'$, $P_6'$ etc. in the case of register A, odd-numbered time slots $P_5'$, $P_7'$ etc. in the case of register B) into respective second-stage registers $II_4$, $II_6$ etc. and $II_5$, $II_7$ etc. whereby all the latter registers are successively reloaded in the course of each incoming frame. Output registers C, D are alternately fed during the intervals $a$ from the odd-numbered registers $III_{21}$, $III_{23}$ etc. and the even-numbered $III_{20}$, $III_{22}$ etc., respectively, of the third memory stage $M_{III}$ just prior to their respective discharge periods $P_{21}''$, $P_{23}''$ etc. and $P_{20}''$ etc. whereby each outgoing channel always finds a waiting code combination in the associated output registers.

With the specific pattern of signal paths illustrated in FIG. 3, the contents of register $II_4$ are read out into register $III_{21}$ during the subperiod $b$ immediately following the interval $a$ in which register $II_4$ receives the code combination stored in register A. Register $II_5$, on the other hand, is read only four transfer periods later to load the register $III_{25}$. The bits stored in register $II_6$ are transferred to register $III_{22}$ almost a full cycle after their inscription; in a similar manner, registers $II_7$, $II_8$, $II_{10}$ and $II_{11}$ are shown cascaded with registers $III_{26}$, $III_{20}$, $III_{24}$ and $III_{23}$, respectively.

Owing to the mutual disparity of operating periods $tp'$, $tx$ and $tp''$, not every interval $a$ is utilized for the transfer into memory stage $M_{II}$ or out of memory stage $M_{III}$. Register $II_5$, for example, is supplied from register B at the beginning of period $P_6'$ so that the next interval $a$, occurring at the end of the same period, is unused since register B has been emptied and register A has not yet been fully loaded. Similarly, the second interval $a$ of period $P_{19}''$ finds the register D still charged and the register C not yet fully discharged so that one message sample is missed at this point.

No information is lost upon transmission in the opposite direction, i.e., from line PC″ to line PC′, which normally occurs by way of a symmetrical memory section simultaneously with the message transfer just described.

Figure 4:
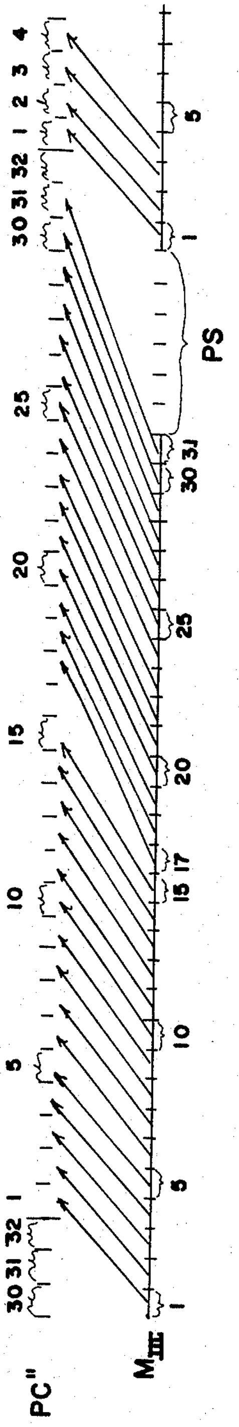
FIG. 4 is another time diagram relating to the operation of that system.

FIG. 4 shows, on a compressed scale with reference to FIG. 3, the temporal relationship between the readout periods of memory stage $M_{III}$ and the times of transfer from the memory output (stage $M_{IV}$) to the time slots of line PC″. In this FIG. the readout periods of the registers of stage $M_{III}$ have been numbered from 1 through 31, with omission of No. 16 inasmuch as the 16th time slot of a frame is used for the conveyance of switching information to programmer EC and possibly to further programmers reached via the outgoing line. Also, no message transfer takes place between the memory and the line PC″ during the 32nd time slot which is used for synchronization purposes.

The readout of the 31st register of stage $M_{III}$ is followed by a pause PS serving to restore the original time lag between the readout of the first register of that stage and the beginning of a new frame of line PC″.

The employment of two cascaded memory stages $M_{II}$, $M_{III}$ with 30 registers each per incoming and outgoing line, as shown in FIG. 3, is advantageous in certain instances, as where the registers of the stages $M_{II}$ and $M_{III}$ are coupled together by semipermanent physical connections. In many cases, however, one of these stages can be omitted as illustrated in subsequent Figures.

Figure 5:
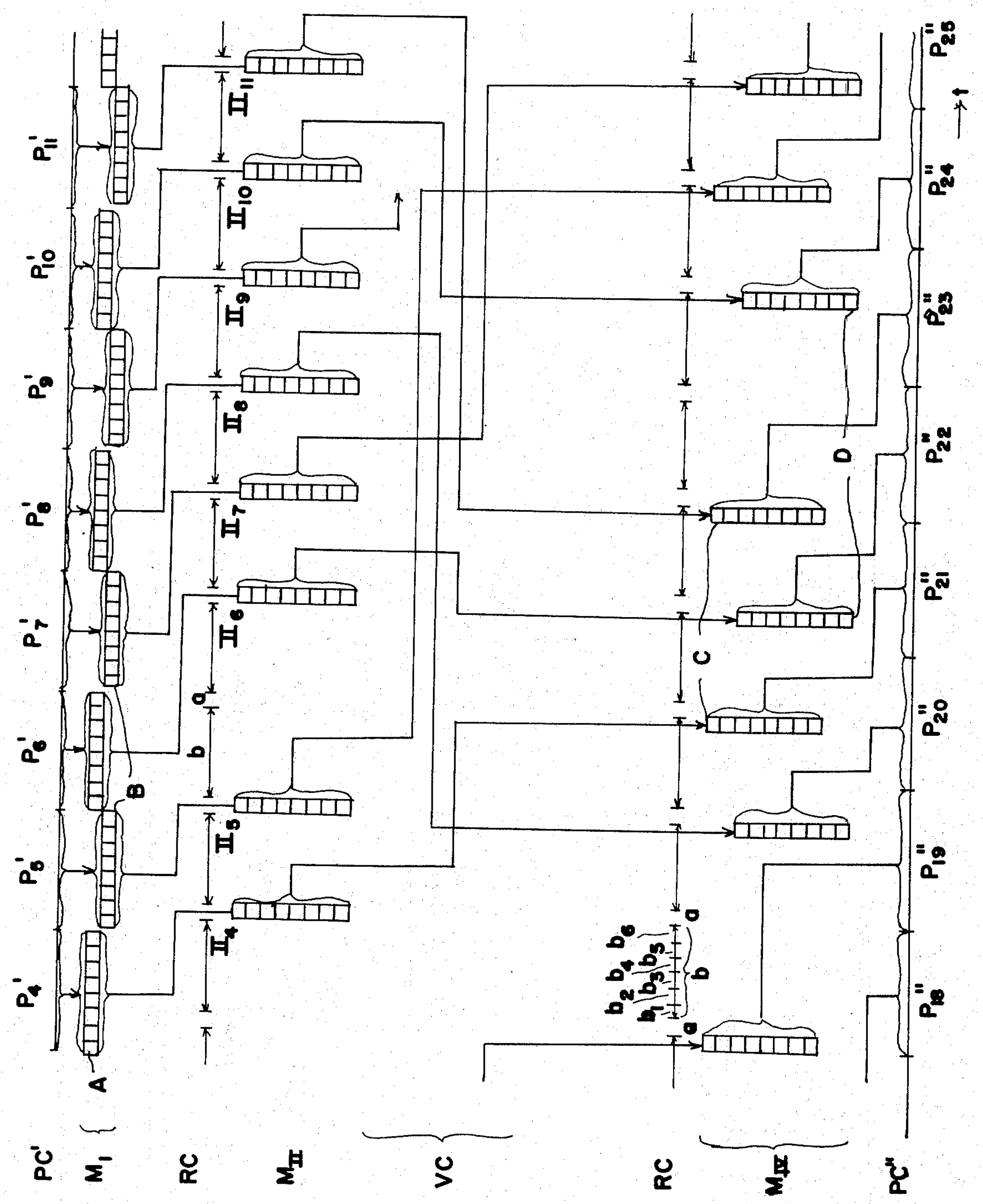
FIG. 5 is a flow chart similar to that of FIG. 4 for a modification of the system shown in FIG. 2.

FIG. 5 shows a flow chart similar to that of FIG. 3 but relating to a system without memory stage $M_{III}$. In this case the contents of the registers of stage $M_{II}$ are read out directly, at the appropriate times and within intervals of the appropriate duration (not exceeding $\Delta t''$, FIG. 3), into output registers C and D. For this readout the subperiod $b$ is divided into a number of phases $b_1 - b_6$, in a manner similar to that illustrated in graphs 1$c$ and 1$e$ of FIG. 1, the duration of each of these phases being shown equal to that of subperiod $a$ although this is not essential. One of these phases, specifically the interval $b_6$, is chosen as the transfer phase; as will be more fully described hereinafter, the remaining phases may be used for the loading of other output registers C, D assigned to further outgoing lines not illustrated in FIG. 5.

In the system of FIG. 5 the switching circuit VC makes and breaks the selected connections between memory stages $M_{II}$ and $M_{IV}$, each register of stage $M_{II}$ being again permanently assigned to a respective time slot of incoming line PC′.

Figure 6:
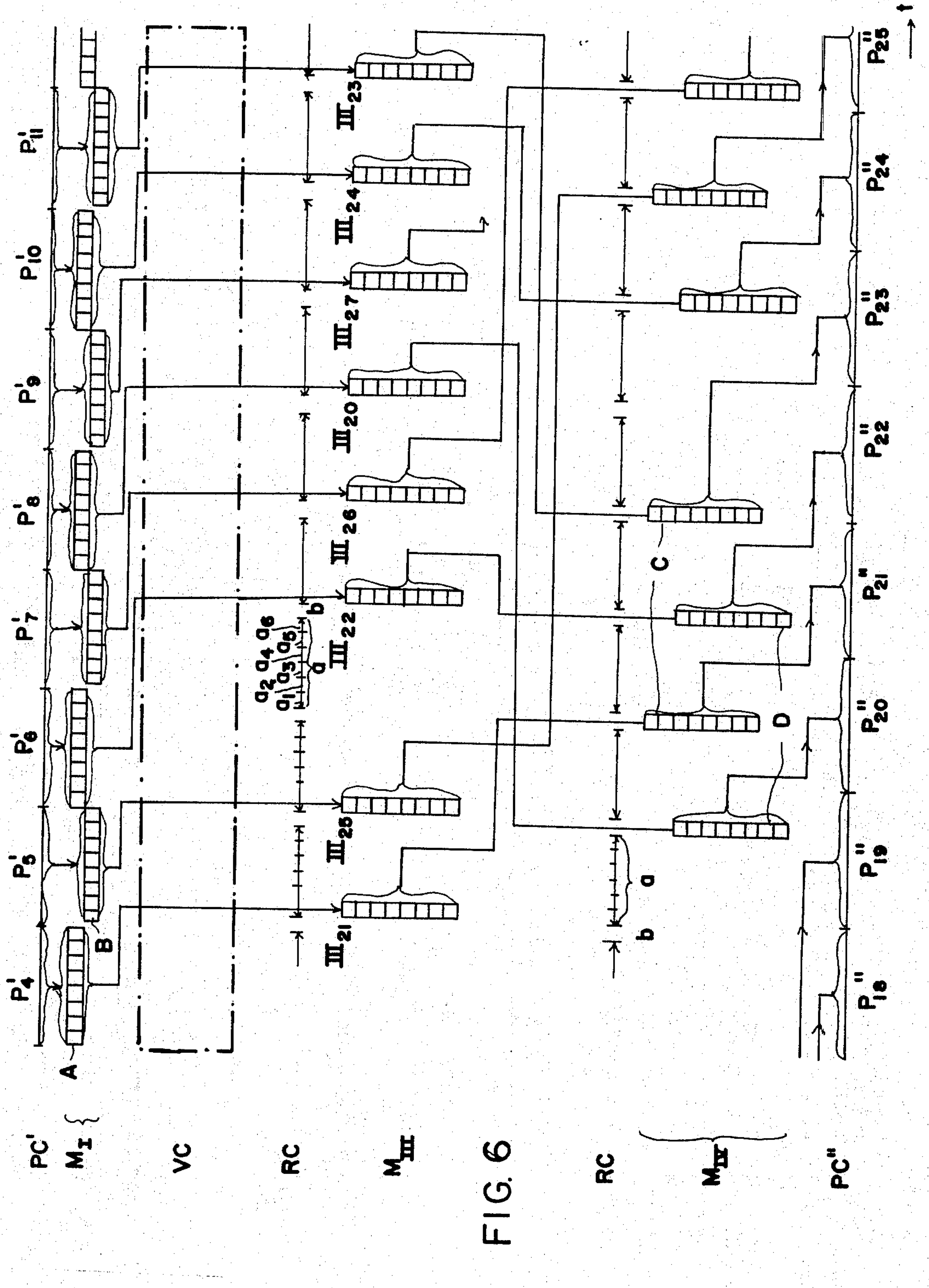
FIG. 6 is another such flow chart relating to a different modification.

An alternate three-stage memory (with omission of stage $M_{II}$) has been illustrated in FIG. 6. Here the transfer of message samples from input registers A and B to the registers of intermediate stage $M_{III}$ proceeds, over paths established by switching circuit VC, during a phase $a_1$ whereas the readout into registers C and D occurs during a subperiod *b* of similar duration. The transfer phase $a_1$ is one of several phases $a_1 - a_6$ into which the first part *a* of an operating period *tx* has been divided, in a manner similar to that shown in graph 1*d* of FIG. 1. The remaining phases $a_2 - a_6$ may be used to load other registers of the intermediate stage $M_{III}$ from different input registers A, B assigned to incoming lines not shown in FIG. 6, as likewise more fully discussed below.

Figure 7:
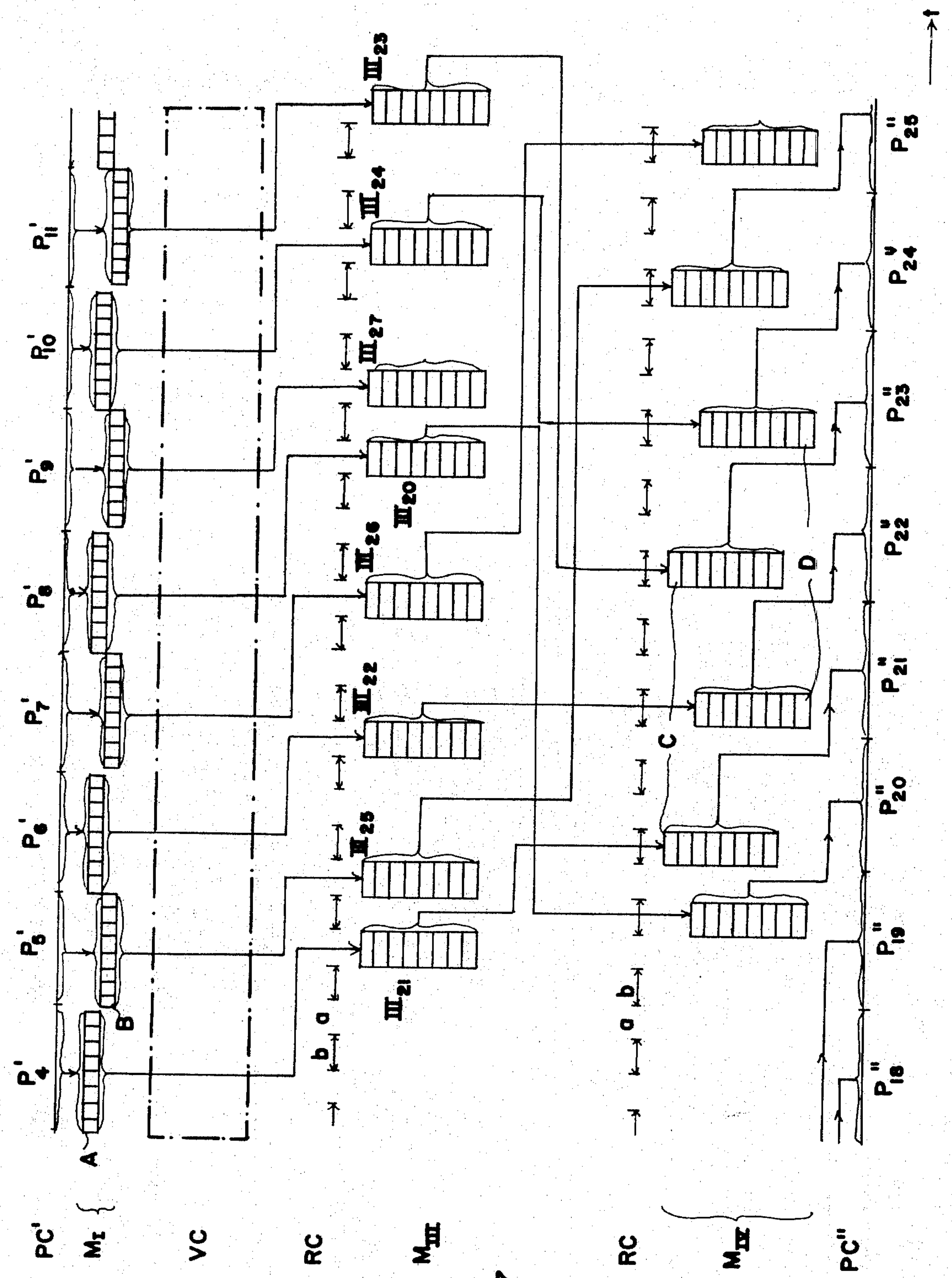
FIG. 7 is a variant of the flow chart of FIG. 6.

FIG. 7 shows a memory of the same structure as that of FIG. 6 but with a transfer period divided into two equal subperiods *a*, *b* as discussed above with reference to graph 1*b* of FIG. 1. Subperiod *a* is used for the loading of the registers of stage $M_{III}$ whereas subperiod *b* serves for the transfer of the stored bits from these registers to output stage $M_{IV}$.

Figure 8:
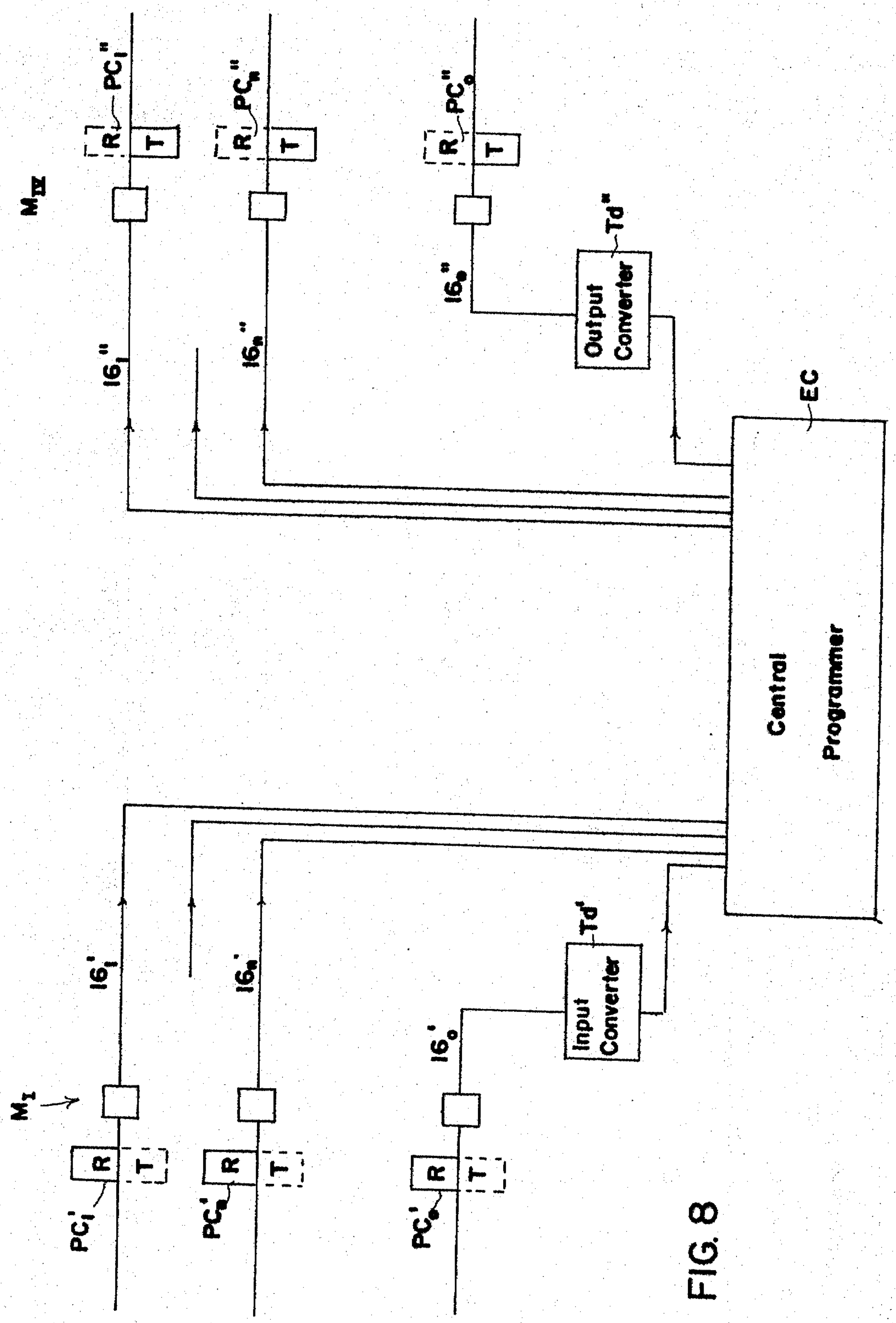
FIG. 8 is a layout similar to that of FIG. 2, showing additional components.

FIG. 8 shows the programmer EC together with parts of the input and output memory stages $M_I$ and $M_{IV}$ in a system as described with reference to FIG. 2, i.e., one having a first group of lines $PC_1' - PC_N'$ and a second group of lines $PC_1'' - PC_N''$. The 16th code combination of each frame from any incoming line is fed directly from the corresponding input register unit to programmer EC, as shown at $\mathbf{16}_1' - \mathbf{16}_N'$, analogous information being supplied by the programmer to the corresponding time slot of each frame of the several outgoing lines as indicated at $\mathbf{16}_1'' - \mathbf{16}_N''$.

FIG. 8 also illustrates the presence of an additional line $PC_o'$ in the first group and a corresponding line $PC_o''$ in the second group, it being assumed that these particular lines do not carry any switching information so that their 16th channels are available for message transmission between lines $PC_o'$ and $PC_o''$. To this end the 16th output $\mathbf{16}_o'$ generated by the corresponding unit of memory stage $M_I$ during each frame is fed to a code converter T*d'* for temporary storage and transmission, via programmer EC, to a complementary code converter T*d''* delivering the message sample at an appropriate instant, as indicated at $\mathbf{16}_o''$, to the corresponding output register unit of memory stage $M_{IV}$ for insertion into the 16th channel of line $PC_o''$; the reverse procedure occurs, of course, for communication between the receiving section R of line $PC_o''$ and the transmitting section T of line $PC_o'$.

If several incoming lines have a common origin, the switching information relating to their channels may be carried in the 16th time slots of fewer than all these parallel lines so that the corresponding time slots of some of these lines may be used for message communication or other purposes, e.g., as just described with reference to line $PC_o'$; analogous considerations apply to the switching information accompanying the message channels of several outgoing lines headed for the same destination, with availability of one or more of their No.16 channels to carry messages as described with reference to line $PC_o''$.

Thus, for example, the programmer EC may be informed by the signal $\mathbf{16}_1'$ that on the third channel of line $PC_1'$ there is a call waiting for a subscriber *x* to be served through an exchange *y*; the programmer, knowing that exchange *y* can be reached from its own station via, say, line $PC_2''$, selects an available channel of that line, e.g., the No. 1 channel, and operates the connector VC (FIG. 2) to link the receiving and transmitting sections R, T of channel 3 of line $PC_1'$ with the opposite sections of channel 1 of line $PC_2''$. The information concerning subscriber *x* is relayed to station *y* by the programmer on the 16th channel of line $PC_2''$. The 16th channel of each of these lines may also carry supervisory signals not affecting the connector VC, such as rate-counting pulses, which are relayed unaltered by the programmer; the same path can be used for the transmission of an end-of-call signal which terminates the connection.

Figure 9:
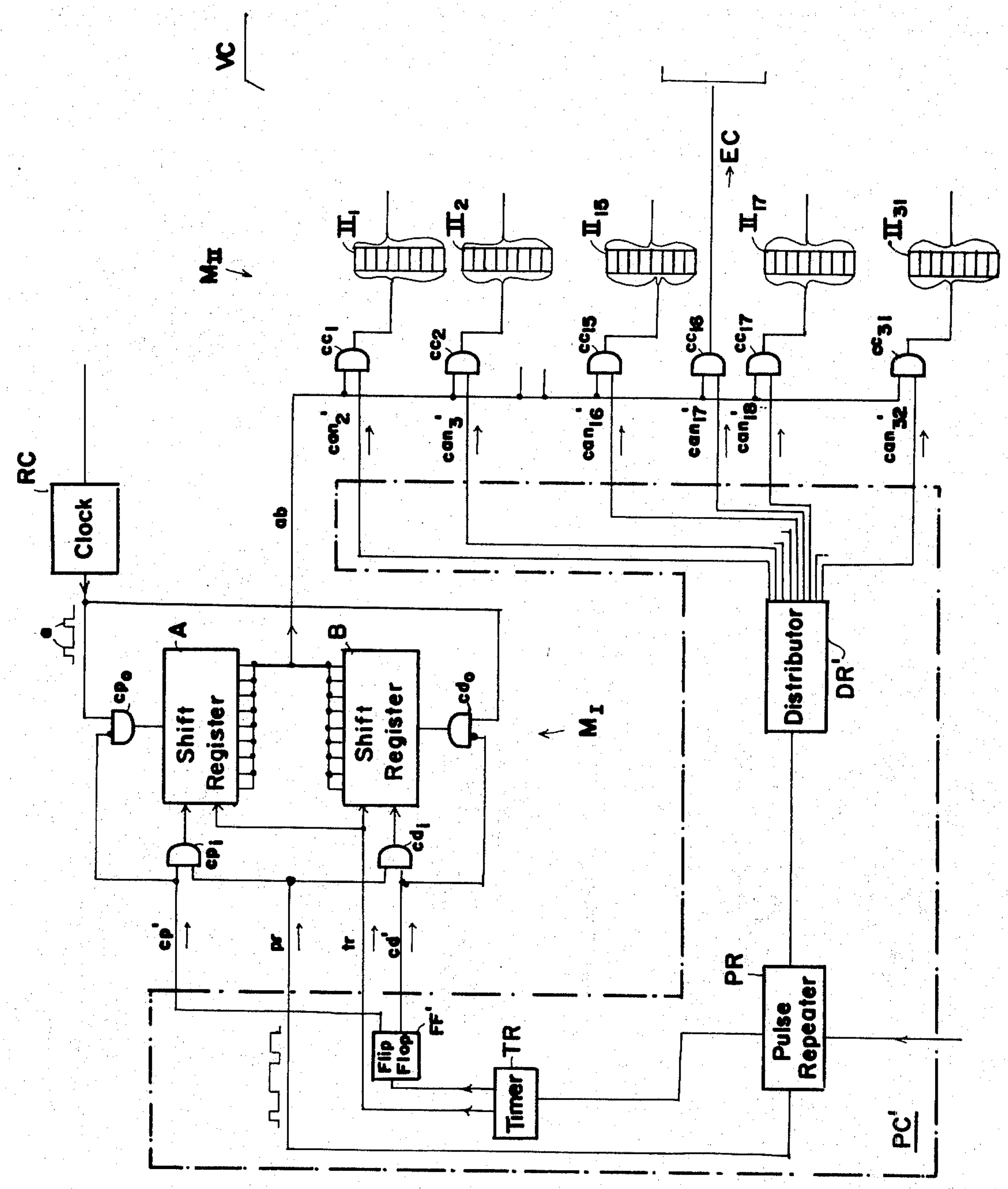
FIG. 9 is a block diagram illustrating in detail the receiving half of a system embodying my invention.
Figure 10:
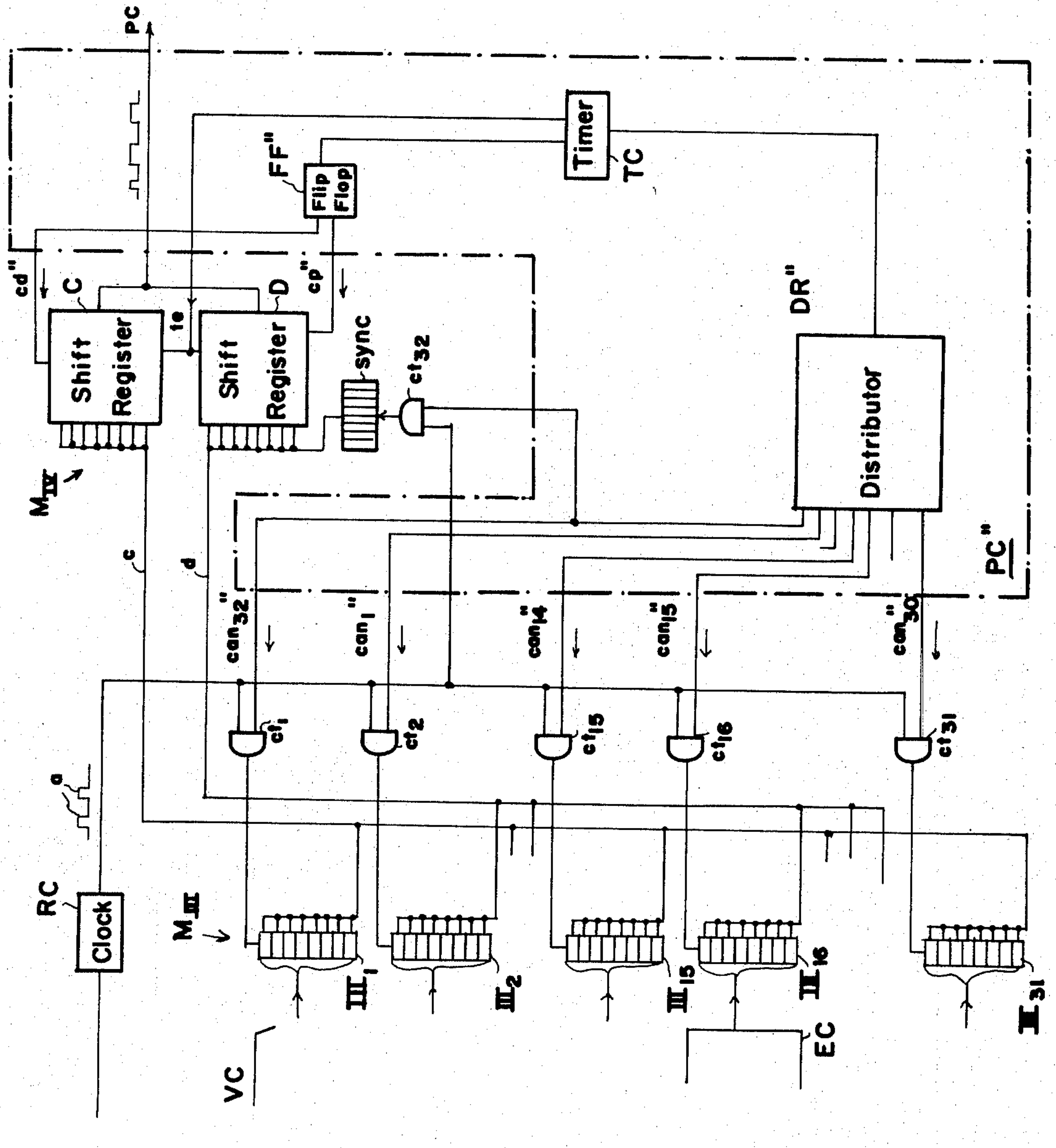
FIG. 10 is a block diagram similar to FIG. 9, showing the complementary transmitting half of the system.

FIG. 9 shows details of the first or receiving half of a system with either four or three memory stages as shown in FIGS. 3 or 5, including the receiving terminal of an incoming line PC', the associated shift registers A and B of stage $M_I$ and some of the nondestructibly readable registers and stage $M_{II}$. A pulse repeater PR receives the incoming signals and, in response to their synchronizing pulses, controls a timer TR which generates a train of pulses applied to registers A and B via a stepping lead *tr* whereby the incoming bits of each channel are successively stored in eight bistable elements of either register. A flip-flop FF' is tripped by the timer TR at the beginning of each eight-bit code combination to energize one of two conductors *cd'* (*odd-numbered channels*) *and cp'* (*even-numbered channels*) *leading to respective inputs of a pair of AND gates* $cd_i$ and $cp_i$; the other inputs of these AND gates receive on a conductor *pr* the output signals of pulse repeater PR which are thus alternately directed to register B and register A. Conductor *cd'* also extend to an inverting input of a coincidence gate $cd_o$ receiving on its other input a train of pulses *a* which mark the transfer intervals similarly designated in FIGS. 3 and 5 and which are generated by the clock circuit RC already referred to. Similarly, conductor *cp' extends to an inverting input of a coincidence gate* $cp_o$ also receiving on its other input the pulses *a* of clock circuit RC. With gate $cd_i$ open to conduct the incoming bits of the odd-numbered channels into register B, gate $cp_o$ passes the clock pulses *a* into a reading input of register A to deliver its contents to a circuit *ab* consisting either of a single wire for serial readout or of eight separate wires for parallel readout. In like manner, gate $cp_i$ passes the incoming bits of the even-numbered channels to the writing input of register A while clock pulses *a* traverse the gate $cd_o$ to clear the previously loaded register B by feeding its contents to circuit *ab*. The latter is multiplied to respective inputs of a number of AND gates $cc_1 - cc_{31}$ , whose other inputs are sequentially energized by a distributor DR' under the control of pulse repeater PR; upon the arrival of each new code combination at the repeater, the distributor is advanced to turn off a previously conducting gate and to turn on the next gate in the cyclic order by applying thereto a routing pulse $can_2' - can_{32}'$. Since the 32nd channel of each frame carries no message signals, and since there is no corresponding register in memory stage $M_{II}$, no routing pulse need be emitted by the distributor DR' during the loading of register B in the first time slot of any frame during which the register A is merely cleared; during the time slot immediately following, the presence of pulse $can_2'$ directs the contents of register B into the first register $II_1$ of stage $M_{II}$. After the register $II_{15}$ has been similarly charged in the presence of routing pulse $can_{16}'$, the next such pulse $can_{17}'$ unblocks the gate $cc_{16}$ whose output leads directly to programmer EC as described above with reference to FIG. 8. Thereafter, the other registers of stage $M_{II}$ are loaded upon occurrence of further routing pulses $can_{18}' - can_{32}'$.

The other half of the coupling circuit partly shown in FIG. 9, in a system with four memory stages as shown in FIG. 3 or with three stages as shown in FIG. 6, has been illustrated in FIG. 10 which shows the transmitting section of the terminal of a line PC'' together with output registers C and D and some of the nondestructibly readable registers of intermediate memory stage $M_{III}$. These intermediate-stage registers receive their code combinations from the registers of stage $M_{II}$ (FIG. 3), or directly from coincidence gates $cc_1 - cc_{31}$ if stage $M_{II}$ is omitted, under the control of connector VC as already described and further discussed below with reference to subsequent FIGS: they are sequentially read out by the outputs of respective AND gates $ct_1 - ct_{31}$ which receive timing pulses a from clock RC and routing pulses $can_{32}''$, $can_1'' - can_{30}''$ from a distributor DR'' controlled by a timer TE which may or may not be synchronized with timer TR of FIG. 9 and which establishes a sampling period tp'' *(FIG. 3) for outgoing line PC''. Timer TE periodically trips a flip-flop FF'' for the alternate energization of conductors cp'' (odd) and cd'' (even) leading to respective discharge inputs of registers C and D which are thereby conditioned to deliver their contents to an outgoing lead pc* in response to stepping pulses applied to them from the timer TE via a lead *te*.

The odd-numbered registers such as $III_1$, $III_{15}$ and $III_{31}$ are connected to the writing input of shift register C via a common circuit *c*, a similar circuit *d* linking the even-numbered registers such as $III_2$ and $III_{16}$ to the writing input of shift register D. Like circuit *ab* of FIG. 9, circuits *c* and *d* may each consist of a single wire or eight parallel wires depending upon whether transfer is to proceed in series or in parallel. Register $III_{16}$ receives its code combinations directly from programmer EC, again as described with reference to FIG. 8.

A special coincidence gate $ct_{32}$ responds to the simultaneous presence of a clock pulse *a* and a routing pulse $can_{32}''$ to read a synchronizing code from a store *sync* into the eight binary elements of register D for transmission over line PC'' in the 32nd time slot of each frame.

If memory stage $M_{III}$ were omitted (as in the system of FIG. 5), the registers of stage $M_{II}$ (FIG. 9) would work directly into circuits *c* and *d* during intervals *a* and in a sequence determined by respective coincidence gates forming part of the connector VC and operating under the control of programmer EC; gates $ct_1$ — $ct_{32}$ would be redundant in that case.

Although in each incoming and outgoing time slot there will always exist at least one complete transfer interval *a*, there may also occur a fraction of such an interval at the beginning or at the end of a sampling period. Conventional circuitry may therefore be included in registers A, B, C and D to clear them of an incomplete code combination if the first inscription interval following the reversal of flip-flop FF' or FF'' is too short for the complete registration of an 8-bit code, thereby enabling a correct entry of the code during the next, entire interval *a* occuring in the same sampling period. After a complete inscription, the same circuitry (e.g., a timer measuring the duration of the input signal) may serve to block the register against a possibly incomplete second inscription during the same period.

Reference will now be made to FIGS. 11 – 19 for a description of several possible alternatives in the realization of the connector VC.

Figure 11:
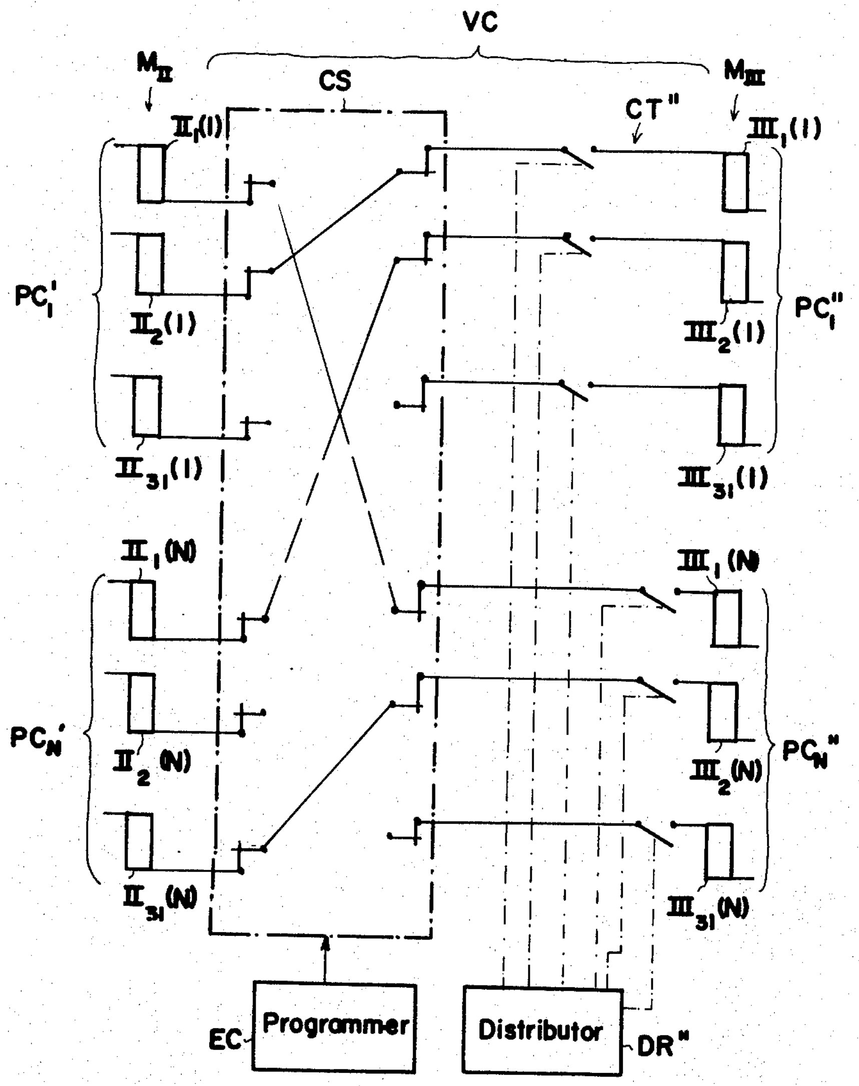
FIG. 11 is another layout similar to FIG. 2, illustrating details of a switching network.

FIG. 11 shows the two intermediate memory stages $M_{II}$ and $M_{III}$ of FIG. 3, stage II comprising registers $II_1$ (1) – $II_{31}$ (1) through $II_1$ (N) – $II_{31}$ (N) for incoming lines $PC_1'$ through $PC_N'$, respectively, whereas stage $M_{III}$ includes registers $III_1$ (1) – $III_{31}$ (1) through $III_1$ (N) – $III_{31}$ (N) for outgoing lines $PC_1''$ through $PC_N''$. The connector VC is here shown as consisting of a switching circuit CS and a gating circuit CT'', the latter successively connecting respective outputs of circuit CS to corresponding registers of stage $M_{III}$ under the control of distributor DR''. Circuit CS is a network of physical connections temporarily established, for the duration of respective calls, with the aid of switches controlled by programmer EC. Thus, for example, the first channel of line $PC_1'$ communicates with the first channel of line $PC_N''$ via a connection between registers $II_1$ (1) and $III_1$ (N), whereas the second channel of line $PC_1'$ is linked with the first channel of line $PC_1''$ over a path extending between registers $II_2$ (1) and $III_1$ (1).

Figure 12:
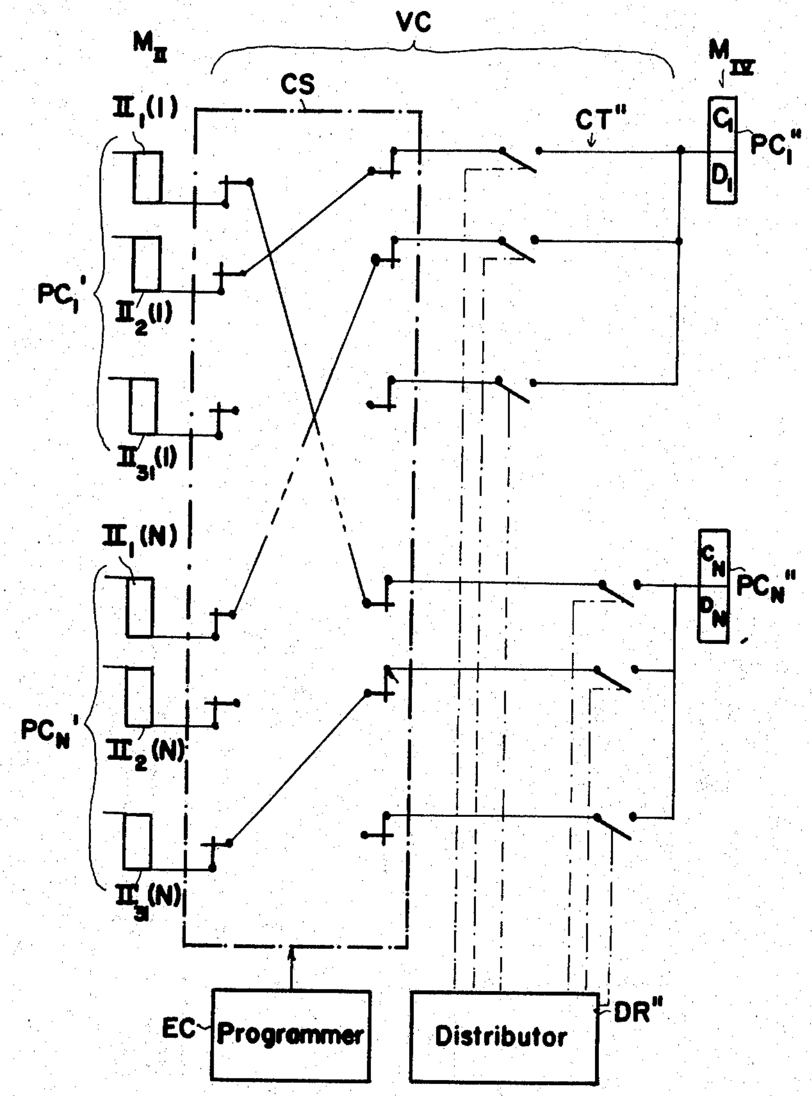
FIGS. 12 and 13 are layouts similar to FIG. 11 but relating to modified systems.

FIG. 12 shows a similar arrangement wherein, however the gating circuit CT'' feeds directly into the output registers $C_1$, $D_1 - C_N$, $D_N$ of lines $PC_1'' - PC_N''$, with suppression of the intermediate memory stage $M_{III}$ as described with reference to FIG. 5.

Figure 13:
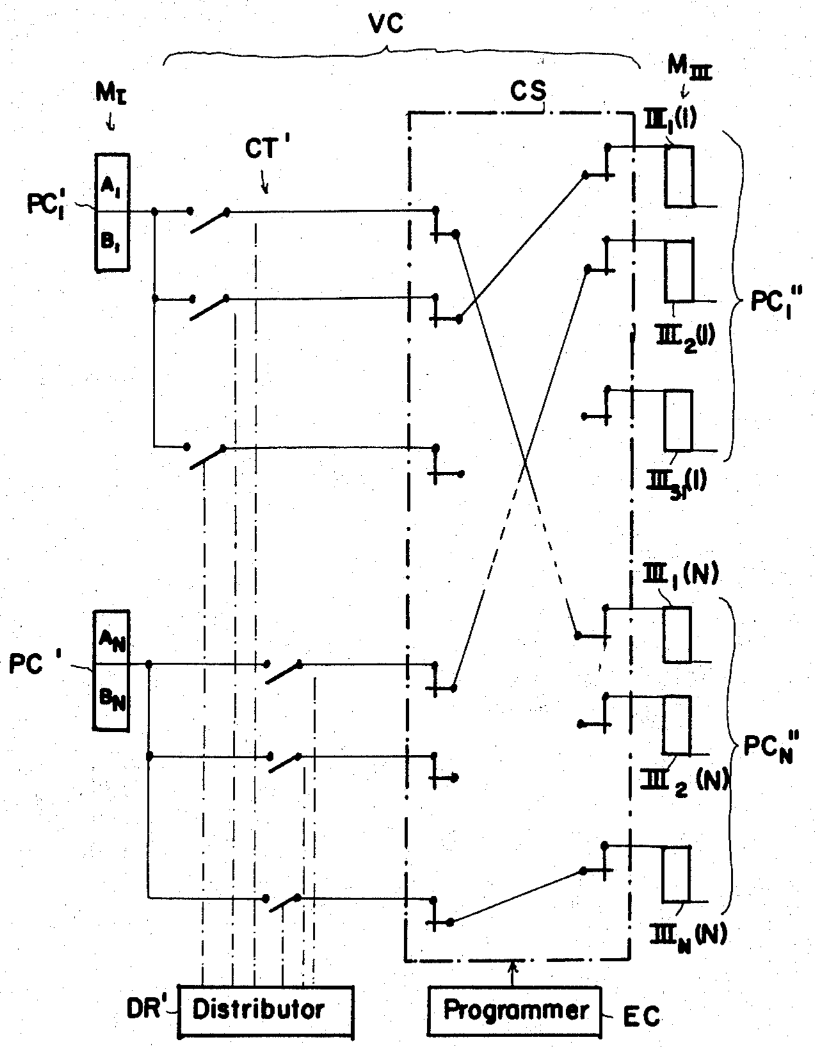

In an analogous manner FIG. 13 shows a switching circuit CS working into memory stage $M_{III}$ under the control of programmer EC, its several inputs being sequentially supplied from input registers $A_1$, $B_1 - A_N$, $B_N$ (assigned to lines $PC_1' - PC_N'$) under the control of a gating circuit CT' responding to the output of distributor DR'; this system lacks the memory stage $M_{II}$ as described with reference to FIG. 6.

The switching networks CS of FIGS. 11 – 13 are relatively inefficient since the connections established thereby remain in existence for extended periods but are utilized for only a small fraction of the time, specifically 1/32nd of each frame in the example here given. An input connector VC, shown in FIG. 14, includes another gating circuit CST which is laid out in the manner of a cross-bar switch and is controlled by the programmer EC to establish selected paths between the registers of memory stage $M_{II}$ and a group of bus bars $SP_1'' - SP_N''$ (each consisting again of a single wire or a set or eight parallel wires, depending on the nature of the transfer) which are multipled to respective groups of inputs of circuit CT'' feeding the registers of stage $M_{III}$ associated with lines $PC_1'' - PC_N''$, respectively. By the selective closure of junctions of matrix CST under the control of programmer EC, in combination with the timing of the switch closure in circuit CT'' under the control of distributor DR'', a brief but periodically recurrent connection can be established between any incoming and any outgoing channel.

Figure 14:
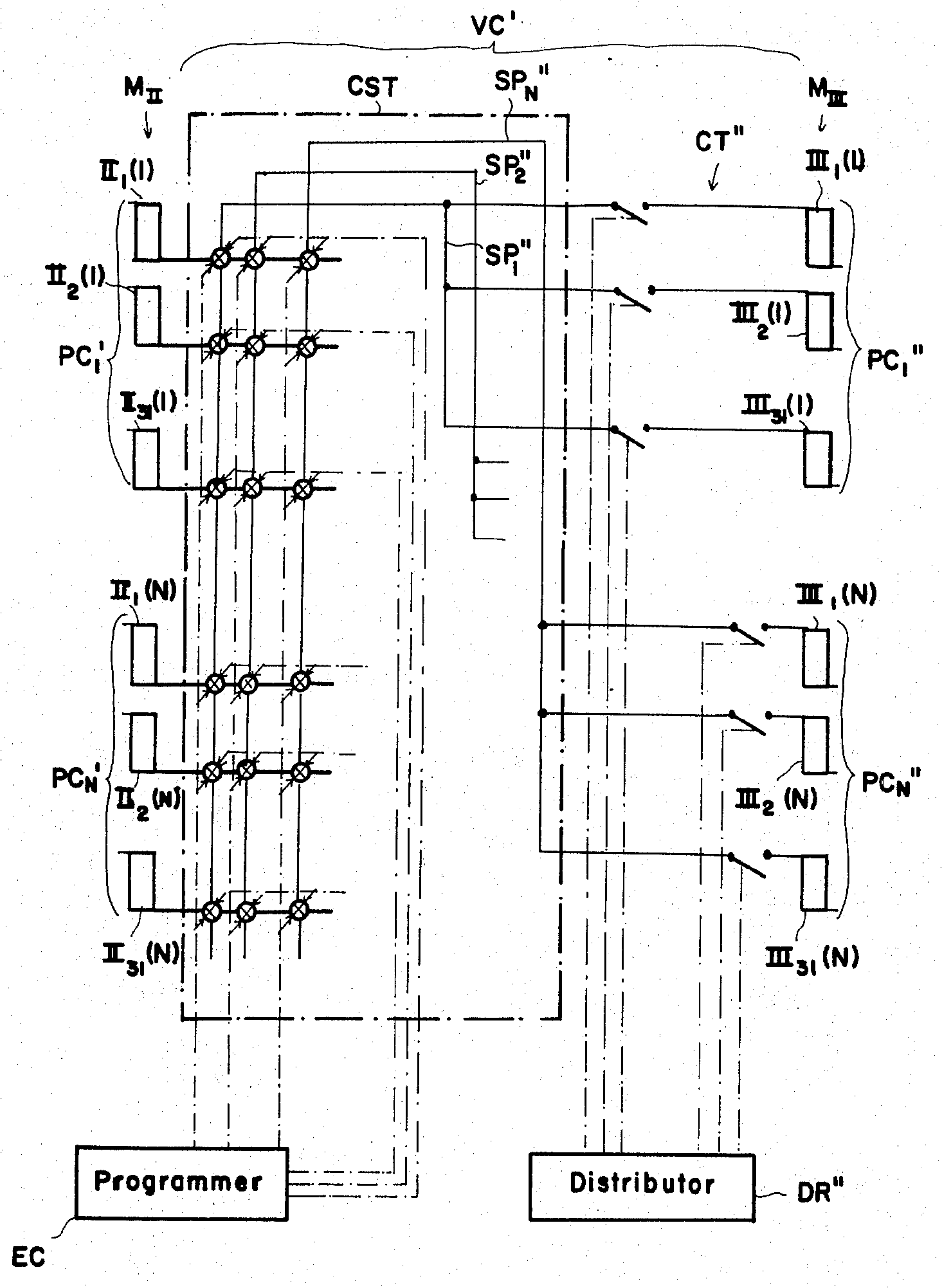
FIG. 14 is a layout similar to FIG. 11, showing a different switching network.
Figure 15:
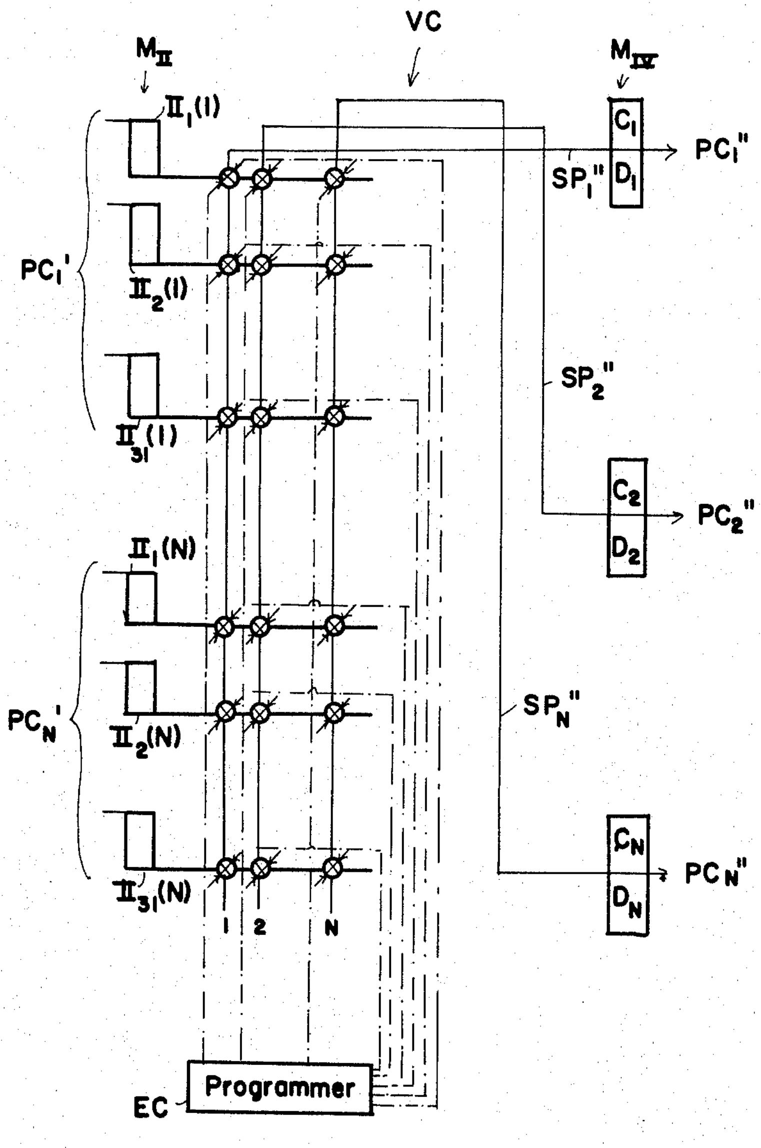
FIGS. 15 and 16 are the counterparts of FIGS. 12 and 13 with reference to the switching network of FIG. 14.
Figure 16:
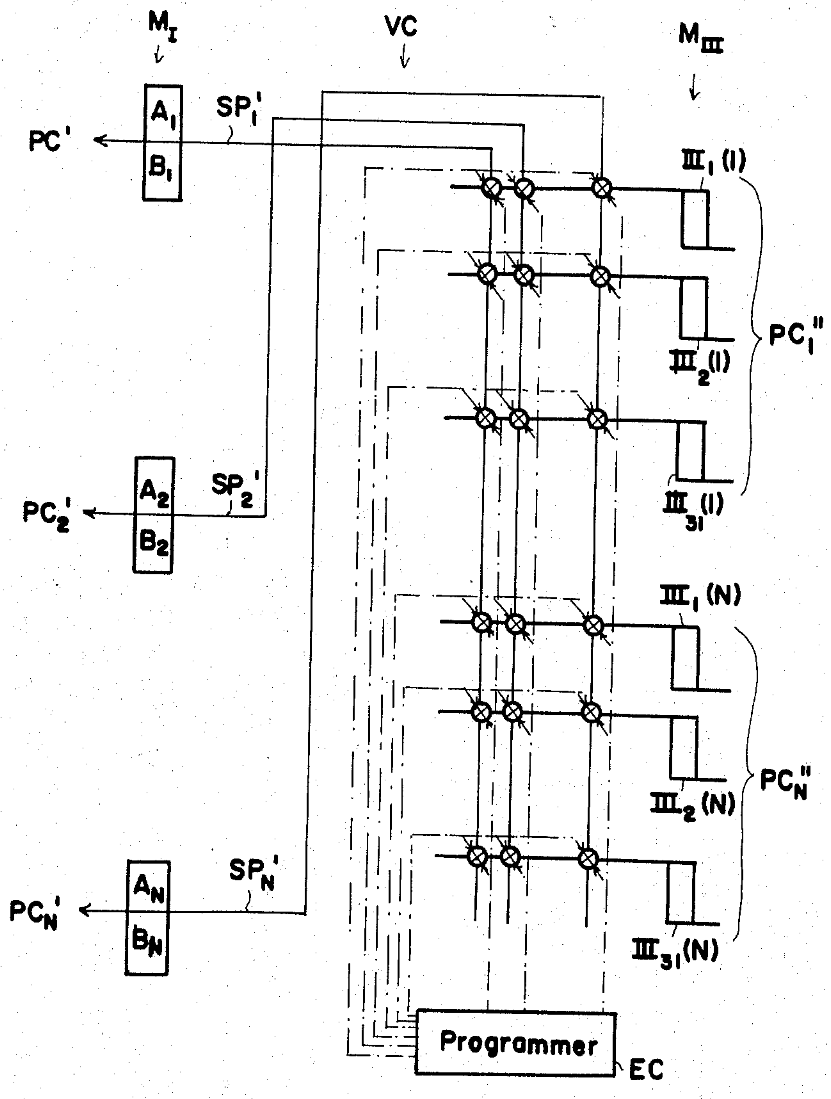

FIG. 15 illustrates a modification of the system of FIG. 14 in which, as in FIG. 12, memory stage $M_{III}$ has been omitted so that signal paths $SP_1''$ – $SP_N''$ terminate directly at output registers $C_1$, $D_1$ – $C_N$, $D_N$ of lines $PC_1''$ – $PC_N''$. An analogous arrangement with omission of stage $M_{II}$, shown in FIG. 16, has the input registers $A_1$, $B_1$ – $A_N$, $B_N$ of lines $PC_1'$ – $PC_N'$ working directly into respective signal paths $SP_1'$ – $SP_N'$ terminating at the switching matrix of connector VC. Signal paths $SP_1''$ – $SP_N''$ of FIG. 15 are each representative of a pair of bus bars, such as the conductors *c* and *d* of FIG. 10, whereas signal paths $SP_1'$, $SP_N'$ of FIG. 16 may be individual bus bars similar to conductor *ab* of FIG. 9.

The subdivision of a subperiod of transfer period *tx* into several phases $b_1$– $b_k$ or $a_1$ – $a_k$, as illustrated in graphs 1*c* – 1*e* of FIG. 1, permits the sequential energization of these bus bars within a single transfer period whereby the output of *kn* incoming channels may be sequentially stored in the memory and read out into *k* output channels in one period, or vice versa.

Figure 17:
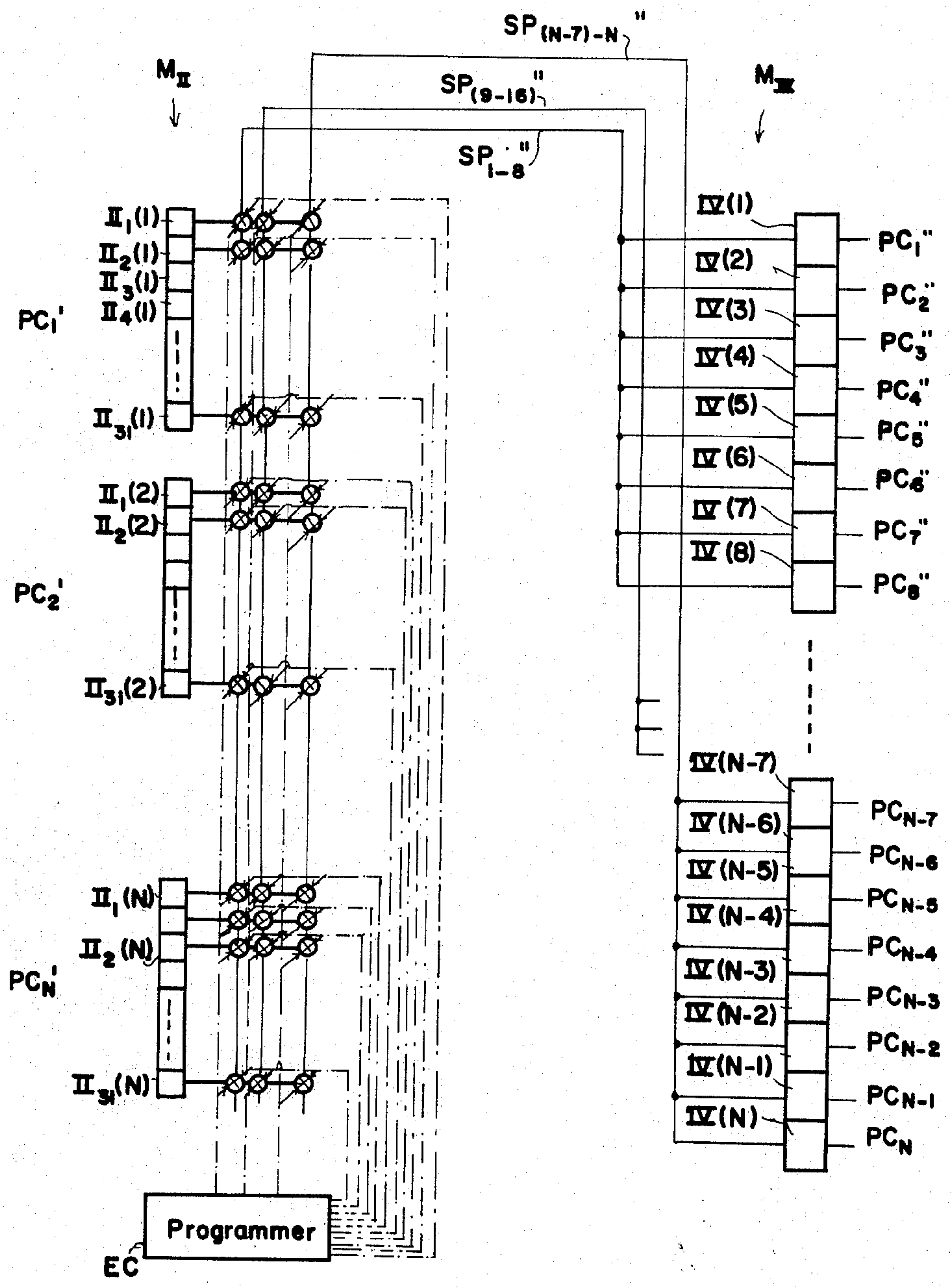
FIG. 17 is another layout generally resembling those of FIGS. 11 – 16 but illustrating a further aspect of the invention.

FIG. 17, which relates to a system ($k = 8$) wherein subperiod *b* has been subdivided into eight phases as in graph 1*e* of FIG. 1, shows the outgoing lines $PC_1''$ – $PC_N''$ divided into subgroups of eight lines each, such as $PC_1''$ – $PC_8''$ and $PC_{N-7}''$ – $PC_N''$, served by respective bus bars $SP_{1-8}''$, $SP_{9-16}''$, . . . $SP_{(N-7)-}''$ originating at a switching matrix similar to that of FIGS. 14 – 16 and terminating at respective output registers IV(1) – IV(8) through IV(N-7) – IV(N) whereby the eight lines of such subgroup may be supplied in the course of a single transfer period from temporarily associated registers in stage $M_{II}$ during respective phases $b_1$ – $b_8$ thereof, by way of one of these bus bars, if the corresponding output registers in stage $M_{IV}$ are conditioned for reception in the allocated phases only.

Figure 19:
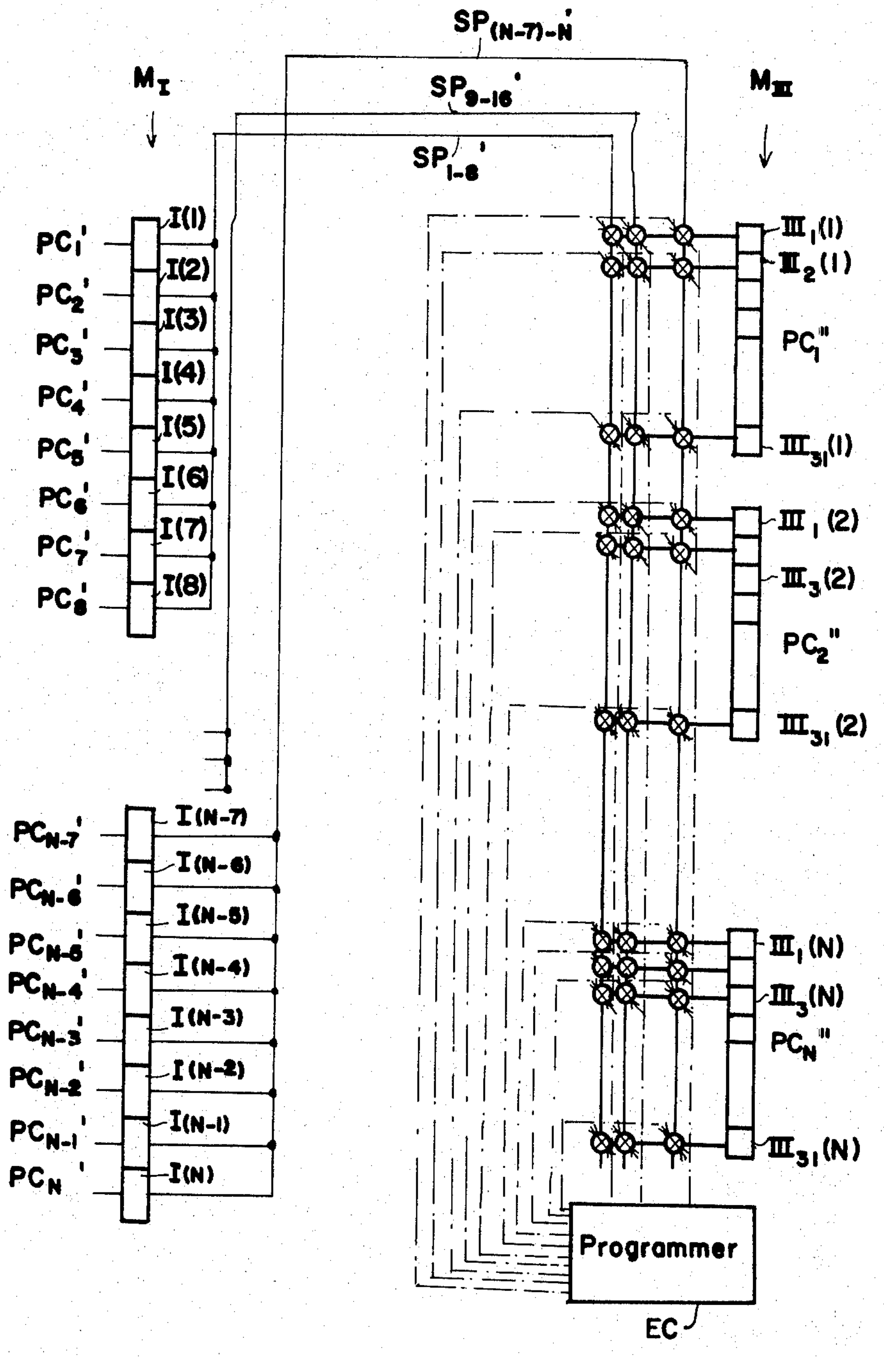
FIG. 19 is a layout similar to FIG. 17 but relating to another variant.

In the related arrangement of FIG. 19, the incoming lines have been divided into subgroups $PC_1'$ – $PC_8'$ through $PC_{N-7}'$ – $PC_N'$ whose input registers I(1) – I(8) through I(N−7) – I(N) work into bus bars $SP_{1-8}'$, $SP_{9-16}\alpha+$ · · · $SP_{(N-7)-N}'$ for selective extension of their signal paths to respective subgroups of registers in stage $M_{III}$ which can thus also be supplied within a common transfer period subdivided into eight phases $a_1$ – $a_8$ and a single phase *b* of similar duration, as generally illustrated in graph 1*d* of FIG. 1.

Figure 18:
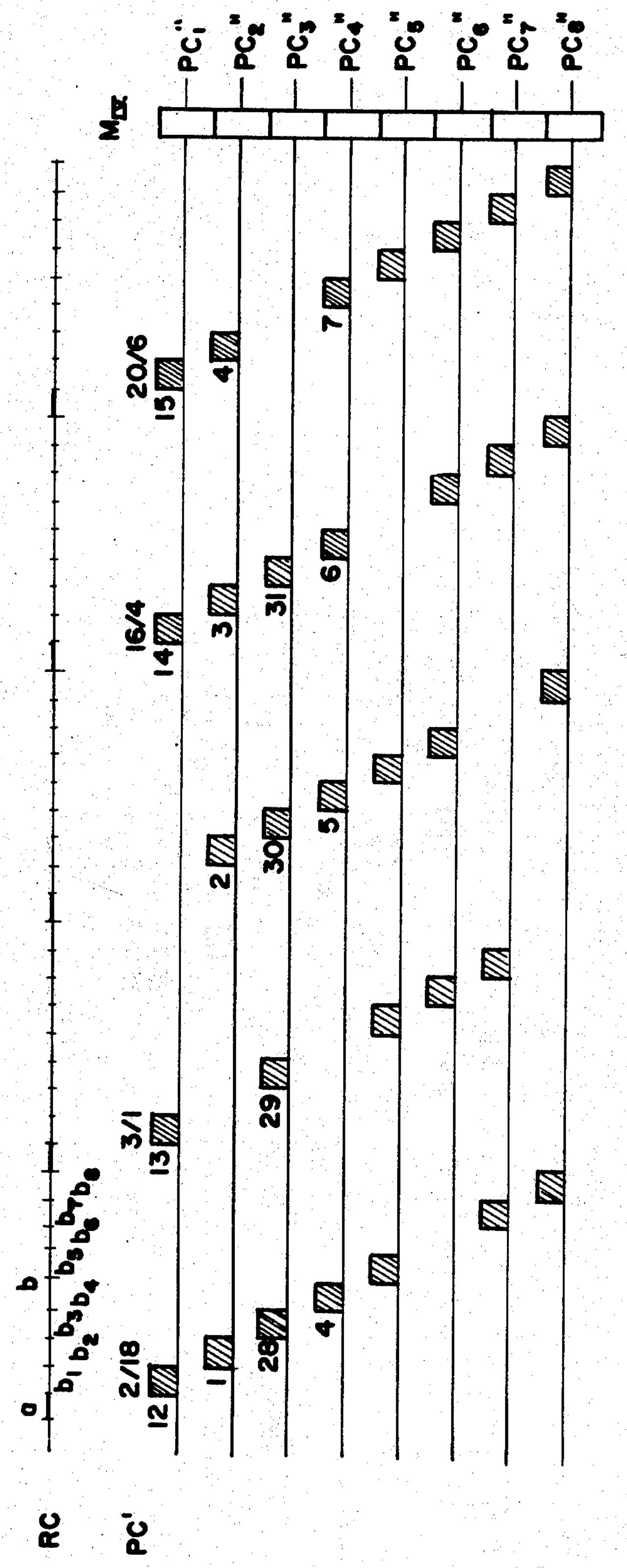
FIG. 18 is a pulse diagram relating to the operation of the system of FIG. 17.

This mode of operation, with specific reference to the system of FIG. 17, has been visualized in FIG. 18 which shows the clock rhythm RC together with the timing of the transmission of code signals from the array of incoming lines PC′ to the subgroup of outgoing lines $PC_1''$ – $PC_8''$ via memory stage $M_{IV}$. The code groups, represented by blocks of a width equaling that of subperiod *a* and of each phase $b_1$ – $b_8$, have been partly provided with numbers showing their origin (at the top) and their destination (on the side). Thus, the first code signal coinciding with phase $b_1$ originates at channel 18 of line $PC_2'$ (as indicated by the numbers 2/18) and is destined for channel 12 of line $PC_1''$; the corresponding code signal of the next transfer period comes from channel 1 of line $PC_3'$ and goes to channel 13 of line $PC_1''$. Several gaps in the array, e.g., one in the first transfer period coinciding with phase $b_6$, are due to the loss of a sample as discussed above with reference to FIG. 3; as is apparent from FIG. 18, these losses are substantially uniformly distributed among the several lines successively supplied within the same transfer period.

Figure 21:
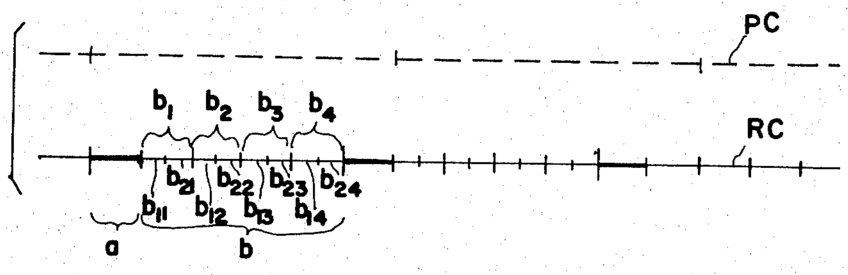
FIG. 21 is another time diagram relating to the circuit of FIG. 20.
Figure 20:
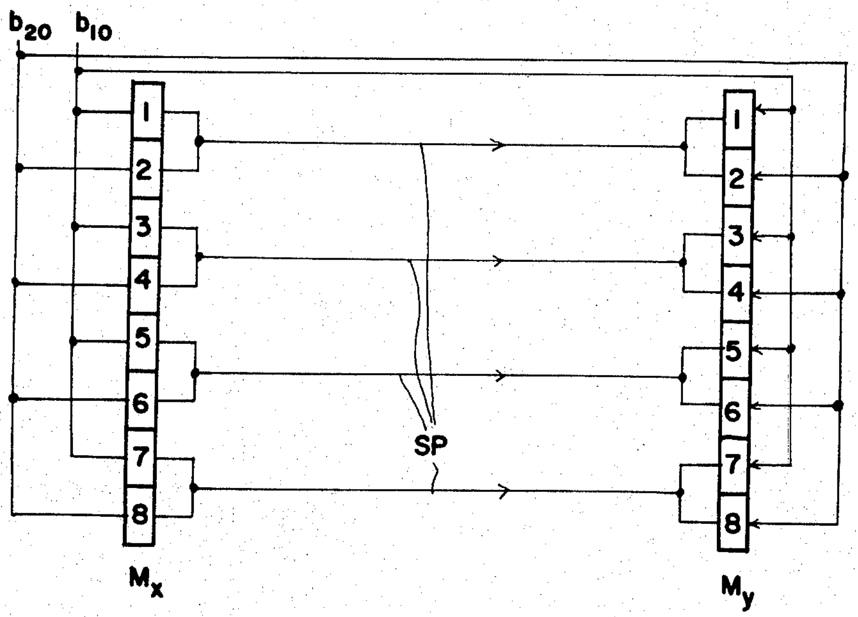
FIG. 20 shows part of a transfer circuit between two cascaded memory stages in a system according to my invention.

FIG. 20 illustrates a hybrid type of transfer between two memory stages, generally designated $M_x$ and $M_y$, which involves the alternate readout of odd-numbered and even-numbered registers of stage $M_x$ during respective intervals generally designated $b_{10}$ and $b_{20}$. As shown in FIG. 21, subperiod *b* is divided into four phases $b_1$ – $b_4$ (each equal to subperiod *a*) which in turn are split into subphases $b_{11}$ – $b_{14}$ and $b_{21}$ – $b_{24}$; the codes inscribed in the eight registers of memory stage $M_x$ in these eight subphases can then be transferred to corresponding registers of memory stage $M_y$ in two steps each lasting for the time of one subphase. Thus, the outputs of registers No. 1 and No. 2 of memory stage $M_x$, alternately triggered via conductors $b_{10}$ and $b_{20}$, are connected in parallel to the correspondingly numbered registers of stage $M_y$ which are blocked and unblocked in the same rhythm, the same mode of connection being used for the other registers (Nos. 3 –8) of each stage. The complete transfer may therefore occur within, say, phase $b_1$ so that phases $b_2$, $b_3$, $b_4$ are available for similar transfers, within the same period, between other combinations of registers over the same signal path SP, as described above with reference to FIGS. 17 – 19.

If the frequency of clock RC is assumed by way of example to be 250 kHz, series transmission in, say, the system of FIG. 17 (with each transfer period divided into nine phases) would be at a rate of 18 Mbit/sec between stages $M_I$ and $M_{II}$ as well as between stages $M_{II}$ and $M_{IV}$. With parallel transmission this rate would be reduced to one-eighth, i.e., 2.25 Mbit/sec, yet the number of wires per bus bar and therefore of associated gates would be increased eightfold. By the switching arrangement of FIG. 20, a but slightly higher flow rate for the bits (2.5 Mbit/sec) can be realized with only four times the number of wires SP, compared with four times that rate and twice the basic number of wires in a four-phase system according to graph 1*c* or 1*d* of FIG. 1.

I claim:

1. In a pulse-code-modulation system comprising an exchange with circuit means for the transmission of interleaved messages by pulse-code modulation over a group of *n* incoming channels terminating at said exchange and a group of *n* outgoing channels originating at said exchange, said incoming channels being constituted by recurrent time slots following one another with a first sampling frequency and said outgoing channels being constituted by recurrent time slots following one another with a second sampling frequency, in combination;

a multistage memory including first-stage register means assigned to said incoming channels for receiving respective code combinations successively arriving thereover, a multiplicity of intermediate-stage registers for concurrently storing respective code combinations from all said incoming channels, and final-stage register means assigned to said outgoing channels for consecutively receiving the stored code combinations from said intermediate-stage registers for delivery to respective outgoing channels;

first timer means for stepping said first-stage register means at said first sampling frequency to receive said code combinations;

transfer means operative at a frequency higher than that of both said sampling frequencies for activating said first-stage register means to read out said code combinations to respective intermediate-stage registers of said memory and for triggering the latter into delivering said code combinations at the same higher frequency from said intermediate-stage registers to said final-stage register means;

second timer means for stepping said final-stage register means at said second sampling frequency to discharge said code combinations into said outgoing channels;

and programmer means for selectively establishing temporary signal paths within said memory from any one of said incoming channels to any one of said outgoing channels;

said intermediate-stage registers forming a first set of $n$ registers and a second set of $n$ registers in cascade therewith, said transfer means having an operating period divided into a first and a second interval, said first-state register means being activable by said transfer means to read out a code combination during said first interval, each register of said first set being operable by said transfer means to transmit a stored code combination to a register of said second set during said second intervenal, each register of said second set being operable by said transfer means to deliver such code combination to said final-stage register means during said first interval.

2. The combination defined in claim 1 wherein said first-stage register means comprises a first pair of registers alternately conditionable for reception by said first timer means and alternately readable under the joint control of said first timer means and said transfer means, said second-stage register means comprising a second pair of registers alternately readable under the control of said second timer means and alternately conditionable for reception by the joint action of said second timer means and said transfer means.

3. The combination defined in claim 1 wherein said first interval is substantially shorter than said second interval.

4. The combination defined in claim 1 wherein said temporary signal paths extend between said first and second sets of registers.

5. The combination defined in claim 1 wherein said intermediate-stage registers are nondestructively readable.

6. In a pulse-code-modulation system comprising an exchange with circuit means for the transmission of interleaved messages by pulse-code modulation over a group of $n$ incoming channels terminating at said exchange and a group of $n$ outgoing channels originating at said exchange, said incoming channels being constituted by recurrent time slots following one another with a first sampling frequency and said outgoing channels being constituted by recurrent time slots following one another with a second sampling frequency, in combination;

a multistage memory including first-stage register means assigned to said incoming channels for receiving respective code combinations successively arriving thereover, a multiplicity of intermediate-stage registers for concurrently storing respective code combinations from all said incoming channels, said final-stage register means assigned to said outgoing channels for consecutively receiving the stored code combinations from said intermediate-stage registers for delivery to respective outgoing channels;

first timer means for stepping said first-stage register means at said first sampling frequency to receive said code combinations;

transfer means operative at a frequency higher than that of both said sampling frequencies for activating said first-stage register means to read out said code combinations to respective intermediate-stage registers of said memory and for triggering the latter into delivering said code combinations at the same higher frequency from said intermediate-stage registers to said final-stage register means;

second timer means for stepping said final-stage register means at said second sampling frequency to discharge said code combinations into said outgoing channels;

and programmer means for selectively establishing temporary signal paths within said memory from any one of said incoming channels to any one of said outgoing channels;

said transfer means having an operating period divided into a plurality of intervals including at least one interval of a duration not exceeding the difference between the length of the more rapidly recurring time slots and said operating period, said first-stage register means being activable by said transfer means to read out each code combination during an interval of said duration, said intermediate-stage registers being operable by said transfer means to deliver their code combinations to said final-stage register means during intervals of said duration.

7. The combination defined in claim 6 wherein said difference is a minor fraction of said operating period, said intervals including a first phase for the readout of said first-stage register means and a second phase for the delivery of the code combinations to said final-stage register means.

8. The combination defined in claim 7 wherein said first and second phases are of like duration.

9. The combination defined in claim 6 wherein each of said groups of channels is divided into at least $k$ subgroups, said first-stage register means comprising a plurality of input register units each assigned to a respective subgroup of incoming channels, said final-stage register means comprising a plurality of output register units each assigned to a respective subgroup of outgoing channels, the intervals of each operating period including one phase for the periodic transfer of up to $k$ code combinations between as many intermediate-stage registers and a like number of register units assigned to one of said groups of channels, said intervals further including $k$ additional phases for the transfer of code combinations between individual intermediate-stage registers and selected register units assigned to the other of said groups of channels.

* * * * *